United States Patent [19]
Kull et al.

[11] Patent Number: 5,790,967
[45] Date of Patent: Aug. 4, 1998

[54] ARRANGEMENT FOR CONTROLLING A FRICTIONAL CONNECTION IN A GEAR-CHANGING APPLIANCE OF AN AUTOMATIC DISCRETE STEP GEARBOX OF A MOTOR VEHICLE

[75] Inventors: Thomas Kull, Waiblingen; Frank Tietze, Stuttgart, both of Germany

[73] Assignee: Mercedes-Benz AG, Stuttgart, Germany

[21] Appl. No.: 625,317

[22] Filed: Apr. 1, 1996

[30] Foreign Application Priority Data

Mar. 31, 1995 [DE] Germany ............ 195 11 897.9

[51] Int. Cl.[6] .................................................. G06G 7/70
[52] U.S. Cl. .................. 701/51; 74/335; 192/3.58; 701/58; 701/60
[58] Field of Search .................. 364/424.08, 424.087, 364/424.091, 424.094; 477/156, 143, 158, 902, 120, 109, 130, 904, 110, 150, 152, 164; 192/3.58, 87.3; 701/51, 58, 60

[56] References Cited

U.S. PATENT DOCUMENTS

| | | | |
|---|---|---|---|
| 4,679,145 | 7/1987 | Beeck et al. ............ | 364/424.08 |
| 5,172,602 | 12/1992 | Jurgens et al. .......... | 364/424.08 |
| 5,240,093 | 8/1993 | Wagner et al. ........... | 192/3.58 |
| 5,349,885 | 9/1994 | Yoshimura et al. ....... | 364/424.087 |
| 5,407,401 | 4/1995 | Bullmer et al. .......... | 477/110 |
| 5,439,427 | 8/1995 | Enokido et al. .......... | 477/130 |
| 5,462,499 | 10/1995 | Bullmer et al. .......... | 477/120 |
| 5,505,675 | 4/1996 | Kuriyama et al. ........ | 477/156 |

FOREIGN PATENT DOCUMENTS

| | | |
|---|---|---|
| 0 644 361 A1 | 9/1994 | European Pat. Off. |
| 0 654 623 A2 | 11/1994 | European Pat. Off. |
| 44 32 850C1 | 8/1995 | Germany. |
| 2 272 260 | 11/1993 | United Kingdom. |

*Primary Examiner*—Jacques H. Louis-Jacques
*Attorney, Agent, or Firm*—Evenson, McKeown, Edwards & Lenahan, P.L.L.C.

[57] ABSTRACT

In an automatic discrete step gearbox of a motor vehicle, the working pressure of a frictional connection (clutch or brake) to be engaged is set at the beginning of a gear-change by an electronic control unit in accordance with a specified required value variation and additionally as a function of correction values. The correction values are determined as a function of deviations between the required transmission torque value and the actual transmission torque value of the frictional connection.

18 Claims, 4 Drawing Sheets

ARRANGEMENT FOR CONTROLLING A FRICTIONAL CONNECTION IN A GEAR-CHANGING APPLIANCE OF AN AUTOMATIC DISCRETE STEP GEARBOX OF A MOTOR VEHICLE

BACKGROUND AND SUMMARY OF THE INVENTION

The invention relates to an arrangement for controlling a working pressure of a pressure medium actuator for actuating a frictional connection, such as a clutch or brake, which can engage and disengage between associated gearbox elements of a gear-changing appliance of an automatic discrete step gearbox of a motor vehicle. An arrangement of the type described generally above has been proposed in the unpublished German patent application P 44 32 850.8-12. The aim of the arrangement proposed is to permit just one electromagnetic open-loop or closed-loop control valve controlled by an electronic control unit to be used for the control of four gearchanging conditions—and, in fact, two steady-state conditions and two transient conditions—of two frictional connections participating in a gear change.

In electronically controlled gearboxes, the frictional connection which has to be engaged is activated by means of a solenoid valve in the event of a gear change. This solenoid valve adjusts the pressure necessary for the filling and further activation of the frictional connection. In this arrangement, the solenoid valve is usually a proportional valve or a pulse-width modulated valve and the electronics receive no feedback concerning the pressure level at the end of the filling procedure. This pressure level and the associated contact torque have a substantial influence on the comfort of a passenger of the vehicle during a gear change. The closed-loop control of the gear change, which is often present, has no effect on this region of the initiation of the gear change because this control can only correct the speed curve after the filling procedure.

The comfort at the input to the gear-changing has to be optimized by accurate setting of the filling excess in the contact phase. For this purpose, a variable is necessary which permits a conclusion about the pressure actually present.

The use of pressure sensors is complicated and expensive. In addition, deviations in the friction coefficient or the reaction pressure spring force of the engaging frictional connection cannot be determined.

An object of the present invention is to optimize passenger comfort at the beginning of the gear-changing procedure without the need to use pressure sensors.

This and other objects have been achieved according to the present invention by providing an arrangement wherein the specified required value variation in the filling phase is determined by a correction value which is determined by a pressure difference corresponding to a torque deviation between an actual value and a required value of a transmission torque of the frictional connection, wherein the required value $M\_Kup\_soll$ of the transmission torque is determined from a required pressure value of the specified required value variation $p\_soll$ and from a geometry factor $k\_Kup$ depending on the geometrical dimensions of the frictional connection in accordance with the condition that (1) $M\_Kup\_soll = k\_Kup * p\_soll$;

wherein the actual value $M\_Kup\_ist$ of the transmission torque is determined from the torque $M\_T$ of the gearbox input shaft and from the moment of inertia $M\_Theta$ of the rotating masses in accordance with the condition that (2) $M\_Kup\_ist = M\_T + M\_Theta$;

wherein the torque $M\_Theta$ of the rotating masses is determined from the rotating masses Theta and a differentiated rotational speed $dn\_T/dt$ of the gearbox input shaft in accordance with the condition that (3) $M\_Theta = 2*\pi*Theta*(dn\_T/dt)$;

wherein the torque $M\_T$ of the gearbox input shaft is determined from a rotational speed $n\_M$ of a driving engine, from a rotational speed ($n\_T$) of a turbine wheel of a hydrodynamic torque converter connected to the gearbox input shaft, from a torque converter characteristic lambda with the associated parameters of engine rotational speed ($n\_M$) and rotational speed ($n\_T$) of the turbine wheel and from a constant κ of the torque converter under the condition that (4) $M\_T = \kappa * lambda * (n\_M)^2$; and wherein the pressure difference dp of the working pressure (p) is determined from the torque deviation dM of the transmission torque ($M\_Kup$) and from a geometry factor $k\_Kup$ of the frictional connection (Kup) in accordance with the condition that (5) $dp = dM/k\_Kup$.

In a further development of the present invention, in the case of low torques of the gearbox input shaft, which are equal to or only slightly higher than the transmission torque of the frictional connection resulting from the contact pressure value of the working pressure, the correction value additionally determines a second specified required variation $p = f(M\_Mot; n\_ab)$ of the working pressure as a function of time in a rotational speed adaptation phase, of the gearchanging time, following on from the filling phase, wherein the second specified required value variation depends both on the torque of the driving engine $M\_Mot$ and on the gearbox output rotational speed $n\_ab$, and wherein a required value $M\_Kup\_soll$ for the transmission torque of the frictional connection is taken into account for the formation of the correction value in the rotational speed adaptation phase under the condition that (1a) $M\_Kup\_soll = k\_Kup * p\_soll$, where $p\_soll$ is equal to the current required value of the working pressure in accordance with the second specified required value variation $p = f(M\_Mot; n\_ab)$, and wherein the correction value is determined under the same conditions (2) to (5) above with the exception of the condition (1) in the filling phase and in the rotational speed adaptation phase.

In the arrangement according to the invention, the filling pressure is determined by means of the contact torque. The torque $M\_Kup\_soll$ which the frictional connection should transmit with the target filling pressure, is compared with the actually effective torque $M\_Kup\_ist$. Sensors which measure the torque directly are not yet suitable for use in mass production. The torque at the gearbox input is therefore determined by means of the torque converter. The rotational speeds at the torque converter input and output are necessary for this purpose. These signals are available in the electronic control unit by means of the engine rotational speed $n\_M$ and the turbine rotational speed $n\_T$. By means of the torque converter characteristic $lambda = f(n\_M; n\_T)$ and the torque converter constant κ, the torque at the turbine wheel can then be determined according to: $M\_T = \kappa * lambda * n\_M^2$. Filtering is appropriate because the rotational speeds are subject to relatively large fluctuations. Generally speaking, rotational masses Theta are also accelerated between the torque converter output and the frictional connection which is being engaged. It is therefore necessary to take account of this torque $M\_Theta$ for correct determination of the torque at the frictional connection. This takes place by means of the measured gradient of the turbine rotational speed according to:

M_Theta=2*π*Theta*dn_T/dt).

Thus the torque actually transmitted by the frictional connection engaging is M_Kup_ist=M_T+M_Theta. The required torque for the engaging frictional connection M_Kup_soll can be determined by means of the filling excess p_Full and a geometrical factor k_Kup according to: M_Kup_soll=k_Kup*p_Full. Using the actual and required torques gives the torque deviation dM and the pressure deviation dp as dM=M_Kup_soll−M_Kup_ist and dp=dM/k_Kup. The deviation is determined by averaging. During the recording period, the deviations are summed for each time step of the control. After the actual recording, the summed value is divided by the number of steps. In the case of gear changes in which the pressure is not substantially changed after filling, the time period of the torque recording can be correspondingly lengthened. This leads to more reliable results. During the recording, the disengaging frictional connection must not distort the result due to additional torques. In the case of gear changes with freewheel, this is ensured if the contact torque of the engaging frictional connection is greater than the engine torque multiplied by the torque converter ratio. In this case, the freewheel lifts off when the end of the filling procedure is reached. In the case of gear changes without freewheel, the disengaging frictional connection must be emptied in good time.

From the above conditions, it follows that the learning of new values is only sensible at small torques. The correction values which are obtained in the case of gear changes with suitable loads can be transferred to the gear changes with other loads. It is also possible to transfer the pressure correction to other gear changes. This is sensible where no adaptation is possible for certain gear changes because, in those cases, the torque converter is always locked-up. The learned corrections are added in the memory of the electronic control unit to give a correction p_kor. In order to make the algorithm insensitive to interference, it is appropriate to add not the full amount but one which has been reduced by a damping factor k_D according to: p_kor=k_D*dp. Storage in a nonvolatile memory is advantageous so that the values are still available after the electricity supply has been switched off.

In the arrangement according to the invention, it is therefore essential that the filling pressure for the following gear changes should be corrected by means of a learning algorithm, with the correction taking place by means of a torque which the engaging frictional connection transmits in the contact phase. The torque of the engaging frictional connection is recorded by means of the torque at the gearbox input. In the case of small input torques, it is therefore possible to extend the recording period to the phase in which the rotational speed change of the gear change takes place.

According to the present invention, the torque at the gearbox input is additionally corrected by means of the mass moment of inertia between the torque converter and the frictional connection. It is advantageous for the disengaging frictional connection not to transmit torque during the learning phase. This is ensured by the use of a freewheel and by the fact that the gearbox input torque is smaller than the contact torque of the engaging frictional connection, emptying of the frictional connection being necessary in good time.

In the present invention, it is furthermore essential that the recording of the torque should take place by means of the rotational speeds at the torque converter and that the torque signal should be smoothed with the aid of filters. The results of one gear change can be transferred to other gear changes for which learning is impossible such as, for example, when the torque converter is locked up.

These and other objects, features and advantages of the present invention will become more readily apparent from the following detailed description when taken in conjunction with the accompanying drawings.

DETAILED DESCRIPTION OF THE DRAWINGS

Figure 1A:
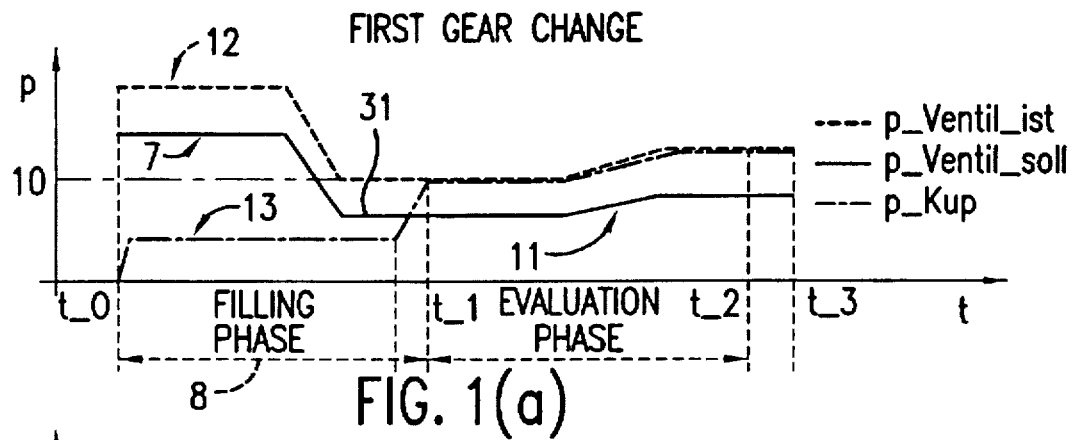
FIG. 1(a) is a diagram of the variation of pressures, plotted against time, for a first gear change.
Figure 1B:
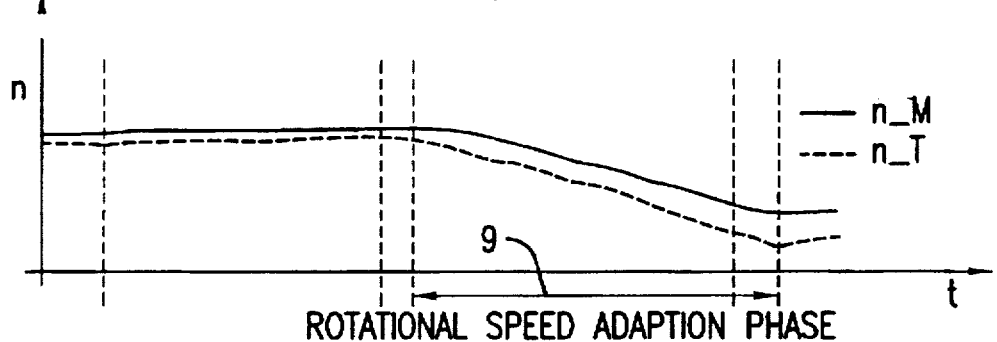
FIG. 1(b) is a diagram for the variation of the gearbox input rotational speed, plotted against time, for a gear change.

On the occurrence of a gear-changing signal at the time t_0 in FIG. 1(a), the working pressure p_Kup is set by the activation of an electromagnetic closed-loop pressure control valve in accordance with a specified required value variation 7 during a filling phase 8, which is initiated by the gear-changing signal, of the gear-changing period T. The gear-changing period T begins at the time t_0 and ends at the time t_3, at which time the gearbox input rotational speed n_T reaches the new rotational speed value corresponding to the new gear. The pressure p_Ventil_ist output from the closed-loop pressure control valve takes the path 12 and the working pressure p_Kup is set in the actuator of the friction clutch connection taking the path 13. At the time t_1, the working pressure p_Kup and the output pressure p_Ventil_ist reach the same contact pressure value 10 so that the gearbox input rotational speed n_T changes and a rotational speed adaptation phase 9 of the gearchanging time T follows on from the filling phase 8. This rotational speed adaptation phase 9 ends with the attainment of the rotational speed value associated with the new gear at the time t_3, as shown in FIG. 1(b). As is shown by FIG. 1(a), the paths 7 and 12 are located relatively far apart.

Figure 1C:
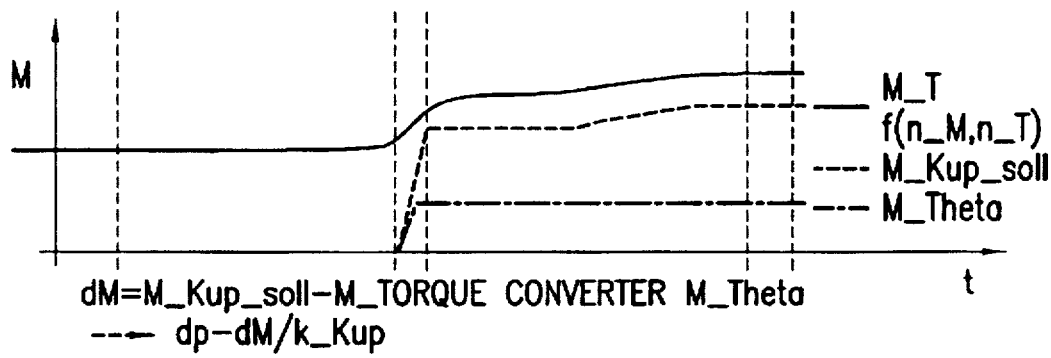
FIG. 1(c) is a diagram for the variation of torques, plotted against time, for a gear change.

The variation of the gearbox input torque M_T (the torque of the turbine wheel of the torque converter), the required value M_Kup_soll of the transmission torque of the frictional connection Kup and the mass moment of inertia M_Theta of the rotating masses are plotted in FIG. 1(c). The determination of the torque deviations dM is also given in this figure.

Figure 2:
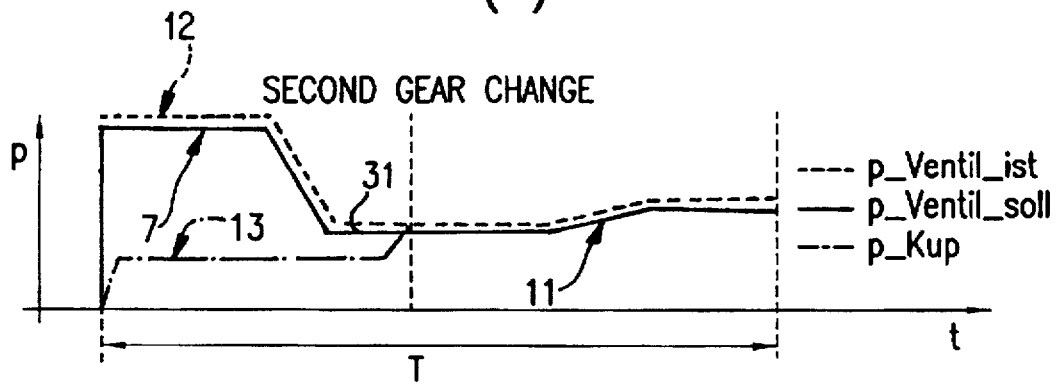
FIG. 2 is a diagram for the variation of pressures, plotted against time, for a second gear change.

FIG. 2 makes it clear how adaptation of both the variation of the working pressure in the clutch actuator and the variation of the valve pressure is achieved by the correction, according to the invention, of the paths 7 and 11 of the required value.

Figure 3:
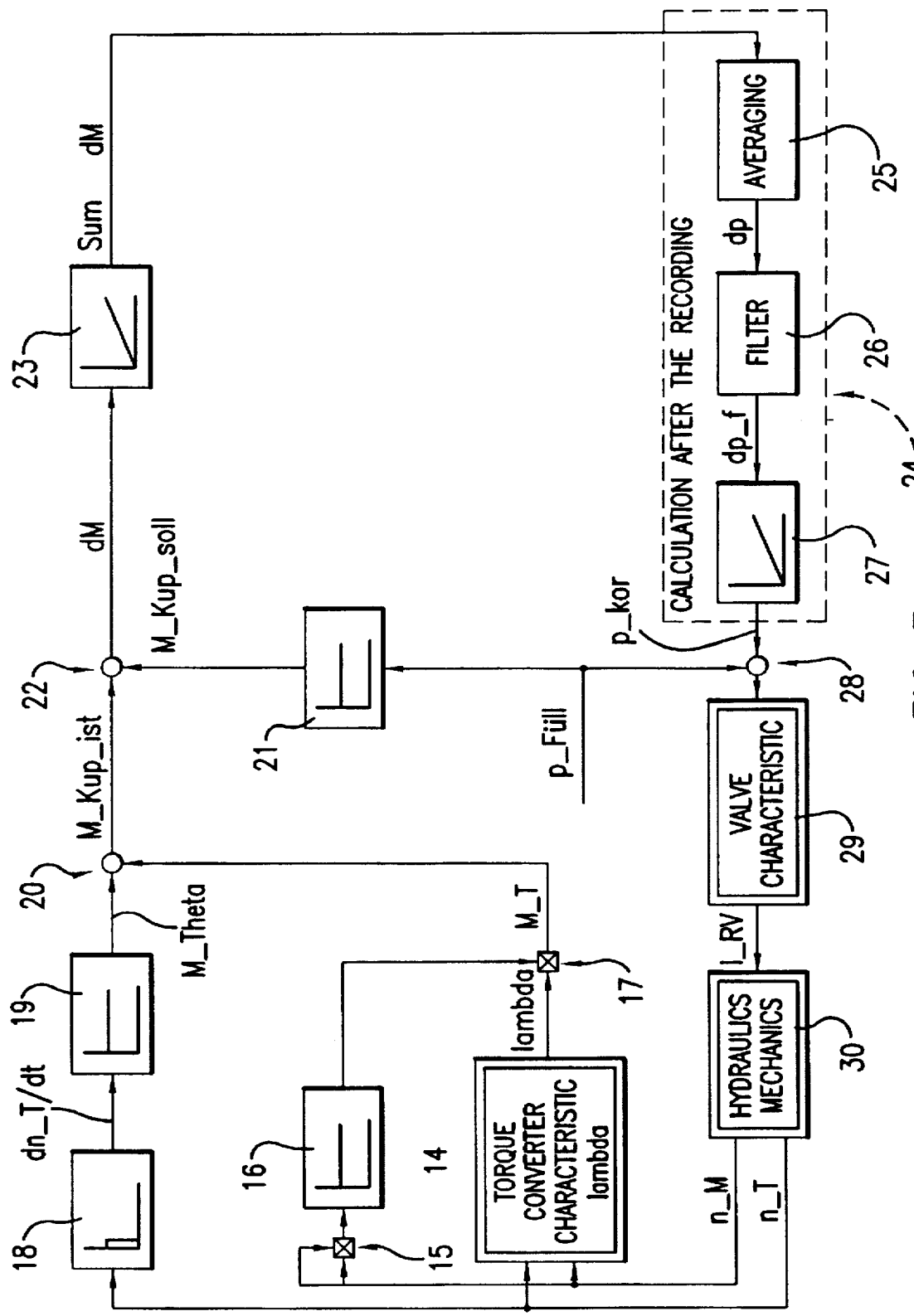
FIG. 3 is a preferred embodiment of an arrangement according to the invention in the form of a block circuit diagram.

The design is represented, in principle, in FIG. 3 in a block circuit diagram of a possible configuration of the invention. It consists in detail of a torque converter characteristic lambda 14, a multiplication station 15 forming the square of the engine rotational speed, a proportional element 16 for taking account of the amplification κ and a multiplication station 17 for calculating the torque converter torque M_T from the output magnitude of 16 and from lambda. A differentiating element 18 derives the turbine rotational speed, dn_T/dt. A proportional element 19 forms the moment of inertia M_Theta from the derived turbine rotational speed. A summation station 20 adds M_T and M_Theta in order to form M_Kup_ist, the actual effective torque. A proportional element 21 forms the required clutch torque M_Kup_soll from the clutch pressure p_Full. A summation station 22 forms the torque deviation dM by subtracting the actual effective torque M_Kup_ist from the required clutch torque M_Kup_soll. An integrating element 23 sums the deviations. The calculations after the recording of the deviations are represented by an interrupted line rectangle 24. These consist of an averaging unit 25, a filter 26 for damping and an integrating element 27 for summing the deviations of various gear-changes.

The output from 27 is added to the clutch pressure in the current gear-change by means of a summation element 28. Also shown are the valve characteristic 29 and the "hydraulics mechanics" block 30 for the behavior of the gearbox.

Figure 4:
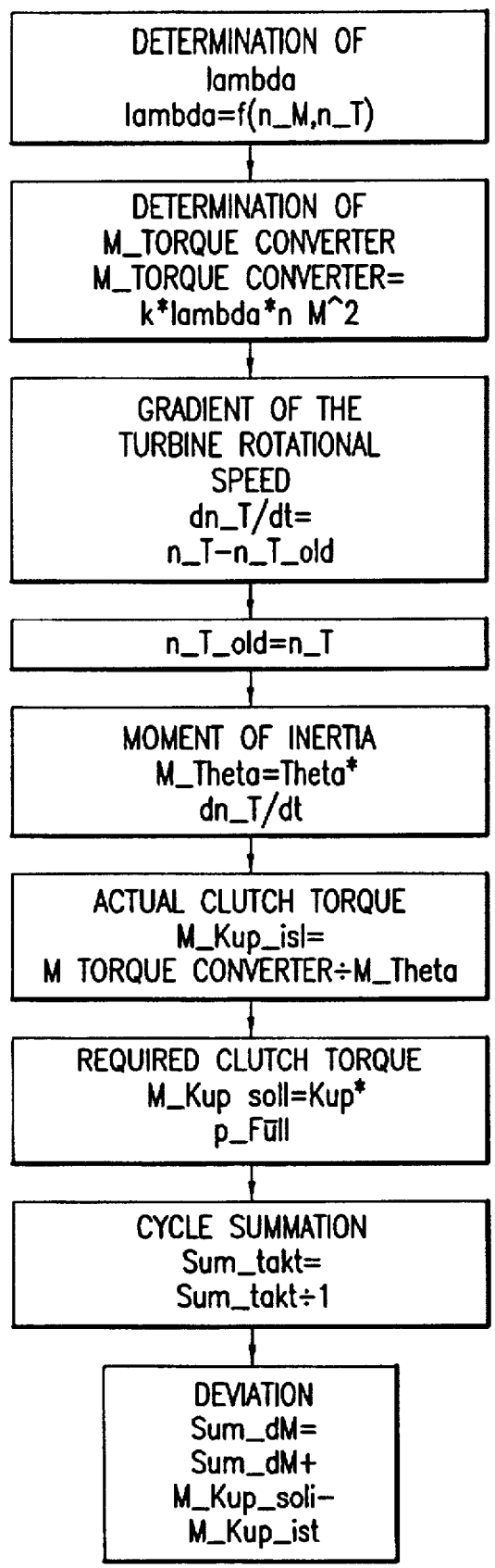
FIG. 4 is a flow diagram for the recording of the torque deviations in the case of the arrangement of FIG. 3.
Figure 5:
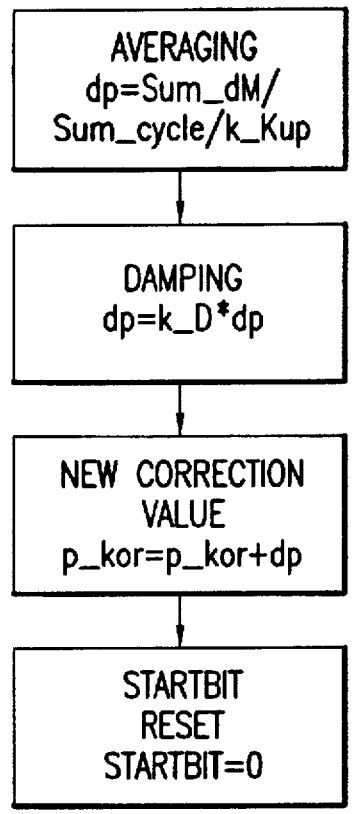
FIG. 5 is a flow diagram for the formation of a correction value in the arrangement of FIG. 3.
Figure 6:
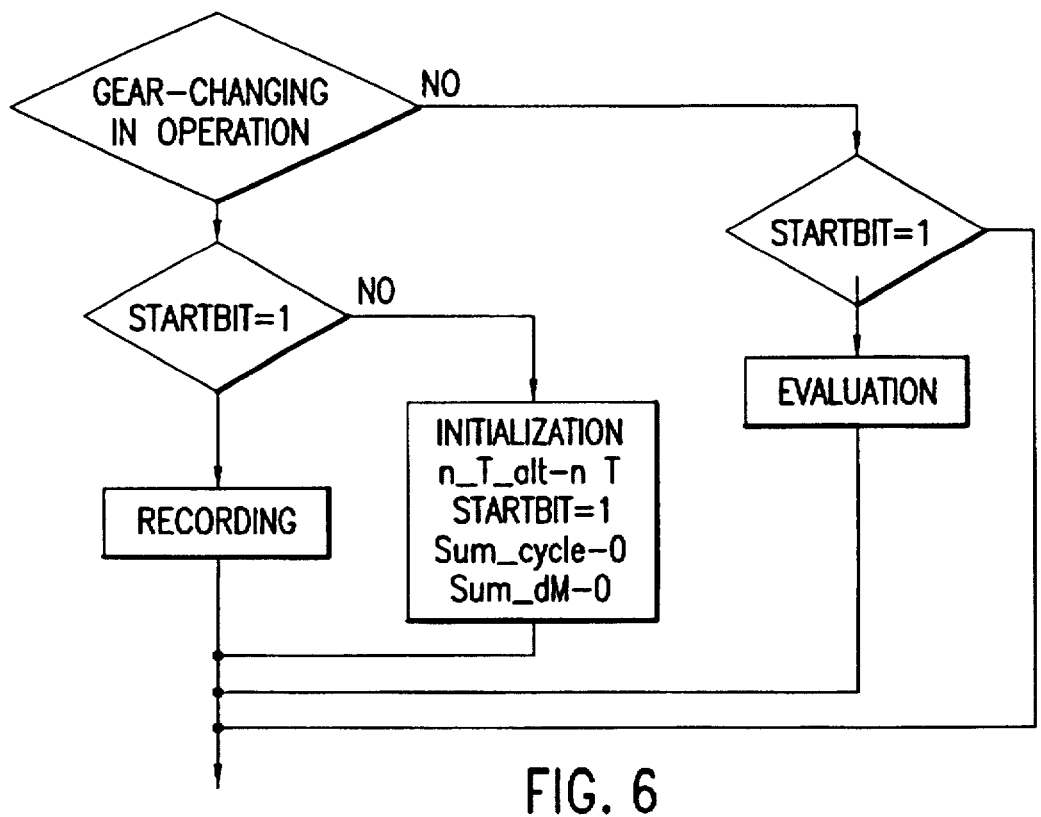
FIG. 6 is a flow diagram for the mode of operation of the arrangement of FIG. 3.

The following procedure takes place in association with FIGS. 4 to 6. The engaging frictional connection is subjected to the pressure p_Full. The valve current I_RV for generating this pressure is determined in a characteristic diagram. The engine rotational speed n_M and the turbine rotational speed n_T are adjusted by means of the further hydraulic and gearbox mechanisms. These rotational speeds are measured. The torque M_T at the turbine end of the torque converter output can be determined by means of the torque converter characteristic lambda as a function of the slip n_M/nT. In order to calculate the actual torque of the engaging frictional connection M_Kup_ist, the moment of inertia M_Theta of the parts between the frictional connection and the turbine must also be determined by differentiation of the turbine rotational speed n_T. The actual torque M_Kup_ist is then compared with the required torque M_Kup_soll. The latter can be determined by means of the pressure p_Full. The deviations dM are summed during the current gear-change. After the actual recording during the gear-change, the sum of the deviations is evaluated. The change to the pressure correction dp_f is determined by forming the average over the duration of the recording and by filtering. This is added to the existing correction p_kor for the previous gear-changes. The pressure p_K is corrected by this value of p_kor during the next gearchange.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An arrangement for controlling a working pressure of a pressure medium actuator for actuating a frictional connection which can engage and disengage between associated gearbox elements of a gear-changing appliance of an automatic discrete step gearbox of a motor vehicle, in which arrangement on the appearance of a gear-changing signal for a gear-change, a required value of the working pressure is set by an electronic control unit by activation of an electromagnetic closed-loop control valve in accordance with a specified variation with time during a filling phase of the gear-changing period, said filling phase ending at a time at which the working pressure in the actuator and an output pressure of the connected closed-loop control valve have the same contact pressure value, wherein the specified required value variation in the filling phase is additionally determined by a correction value which is determined by a pressure difference corresponding to a torque deviation between an actual value and a required value of a transmission torque of the frictional connection, wherein the required value M_Kup_soll of the transmission torque is determined from a required pressure value of the specified required value variation p_soll and from a geometry factor k_Kup depending on the geometrical dimensions of the frictional connection in accordance with the condition that (1) M_Kup_soll=k_Kup*p_soll, wherein the actual value M_Kup ist of the transmission torque is determined from the torque M_T of the gearbox input shaft and from the moment of inertia M_Theta of the rotating masses in accordance with the condition that (2) M_Kup_ist=M_T+M_Theta, wherein the torque M_Theta of the rotating masses is determined from the rotating masses Theta and a differentiated rotational speed dn_T/dt of the gearbox input shaft in accordance with the condition that (3) M_Theta=2*π*Theta*(dn_T/dt), wherein the torque M_T of the gearbox input shaft is determined from a rotational speed n_M of a driving engine, from a rotational speed of a turbine wheel of a hydrodynamic torque converter connected to the gearbox input shaft, from a torque converter characteristic lambda with the associated parameters of engine rotational speed and rotational speed of the turbine wheel and from a constant κ of the torque converter under the condition that (4) M_T=κ*lambda*(n_M)$^2$, wherein the pressure difference dp of the working pressure is determined from the torque deviation dM of the transmission torque and from a geometry factor k_Kup of the frictional connection in accordance with the condition that (5) dp=dM/k_Kup_, wherein said working pressure of the pressure medium actuator is controlled as a function of said correction value.

2. An arrangement according to claim 1, wherein in the case of low torques of the gearbox input shaft, which are equal to or only slightly higher than the transmission torque of the frictional connection resulting from the contact pressure value of the working pressure, the correction value additionally determines a second specified required variation p=f(M_Mot;n_ab) of the working pressure as a function of time in a rotational speed adaptation phase, of the gearchanging time, following on from the filling phase, wherein the second specified required value variation depends both on the torque of the driving engine and on the gearbox output rotational speed, wherein a required value M_Kup_soll for the transmission torque of the frictional connection is taken into account for the formation of the correction value in the rotational speed adaptation phase under the condition that (1a) M_Kup_soll=k_Kup*p_soll, where p_soll is equal to the current required value of the working pressure in accordance with the second specified required value variation p=f(M_Mot;n_ab), and wherein the correction value is determined under the same conditions (2) to (5) with the exception of the condition (1) in the filling phase and in the rotational speed adaptation phase.

3. An arrangement according to claim 2, wherein the correction value is determined using an average of a plurality of values of the deviations of the transmission torque of the frictional connection, the values being respectively determined in one time step.

4. An arrangement according to claim 3, wherein the correction value p_kor is determined from the pressure difference dp and from a damping factor k_D in accordance with the condition that p_kor=dp*k_D, where 0<k_D<1.

5. An arrangement according to claim 2, wherein the correction value p_kor is determined from the pressure difference dp and from a damping factor k_D in accordance with the condition that p_kor=dp*k_D, where 0<k_D<1.

6. An arrangement according to claim 1, wherein the correction value is determined using an average of a plurality of values of the deviations of the transmission torque of the frictional connection, the values being respectively determined in one time step.

7. An arrangement according to claim 6, wherein the correction value p_kor is determined from the pressure difference dp and from a damping factor k_D in accordance with the condition that p_kor=dp*k_D, where 0<k_D<1.

8. An arrangement according to claim 1, wherein the correction value p_kor is determined from the pressure difference dp and from a damping factor k_D in accordance with the condition that p_kor=dp*k_D, where 0<k_D<1.

9. An arrangement for controlling a working pressure of a pressure medium actuator for actuating a frictional connection which can engage and disengage between associated gearbox elements of a gear-changing appliance of an automatic discrete step gearbox of a motor vehicle, in which arrangement upon the appearance of a gear-changing signal for a gear-change, a required value of the working pressure is set by an electronic control unit by activation of an electromagnetic closed-loop control valve in accordance with a specified variation with time during a filling phase of the gear-changing period, said filling phase ending at a time at which the working pressure in the actuator and an output pressure of the connected closed-loop control valve have the same contact pressure value, wherein the specified required value variation in the filling phase is additionally determined by a correction value which is determined by a pressure difference corresponding to a torque deviation between an actual value and a required value of a transmission torque of the frictional connection, wherein the required value of the transmission torque is determined as a function of a required pressure value of the specified required value variation and a geometry factor depending on the geometrical dimensions of the frictional connection, wherein the actual value of the transmission torque is determined as a function of the torque of the gearbox input shaft and the moment of inertia of the rotating masses, wherein the torque of the rotating masses is determined as a function of the rotating masses and a differentiated rotational speed of the gearbox input shaft, wherein the torque of the gearbox input shaft is determined as a function of a rotational speed of a driving engine, a rotational speed of a turbine wheel of a hydrodynamic torque converter connected to the gearbox input shaft, a torque converter characteristic lambda with the associated parameters of engine rotational speed and rotational speed of the turbine wheel and a constant of the torque converter, wherein the pressure difference of the working pressure is determined as a function of the torque deviation of the transmission torque and a geometry factor of the frictional connection, and wherein said working pressure of the pressure medium actuator is controlled as a function of said correction value.

10. A method of controlling a working pressure of a pressure medium actuator for actuating a frictional connection which can engage and disengage between associated gearbox elements of a gear-changing appliance of an automatic discrete step gearbox of a motor vehicle, in which arrangement on the appearance of a gear-changing signal for a gear-change, a required value of the working pressure is set by an electronic control unit by activation of an electromagnetic closed-loop control valve in accordance with a specified variation with time during a filling phase of the gear-changing period, said filling phase ending at a time at which the working pressure in the actuator and an output pressure of the connected closed-loop control valve have the same contact pressure value, said method comprising the steps of:

determining the specified required value variation in the filling phase by a correction value which is determined by a pressure difference corresponding to a torque deviation between an actual value and a required value of a transmission torque of the frictional connection;

determining the required value M_Kup_soll of the transmission torque from a required pressure value of the specified required value variation p_soll and from a geometry factor k_Kup depending on the geometrical dimensions of the frictional connection in accordance with the condition that (1) M_Kup_soll=k_Kup*p_soll;

determining the actual value M_Kup_ist of the transmission torque from the torque M_T of the gearbox input shaft and from the moment of inertia M_Theta of the rotating masses in accordance with the condition that (2) M_Kup ist=M_T+M_Theta;

determining the torque M_Theta of the rotating masses from the rotating masses Theta and a differentiated rotational speed dn_T/dt of the gearbox input shaft in accordance with the condition that (3) M_Theta=2*π*Theta* dn_T/dt);

determining the torque M_T of the gearbox input shaft from a rotational speed n_M of a driving engine, from a rotational speed of a turbine wheel of a hydrodynamic torque converter connected to the gearbox input shaft, from a torque converter characteristic lambda with the associated parameters of engine rotational speed and rotational speed of the turbine wheel and from a constant κ of the torque converter under the condition that (4) M_T=κ*lambda*(n_M)$^2$;

determining the pressure difference dp of the working pressure from the torque deviation dM of the transmission torque and from a geometry factor k_Kup of the frictional connection in accordance with the condition that (5) $dp=dM/k\_Kup$; and controlling the working pressure of the pressure medium actuator as a function of said correction value.

11. A method according to claim 10, wherein in the case of low torques of the gearbox input shaft, which are equal to or only slightly higher than the transmission torque of the frictional connection resulting from the contact pressure value of the working pressure, the correction value additionally determines a second specified required variation $p=f(M\_Mot;n\_ab)$ of the working pressure as a function of time in a rotational speed adaptation phase, of the gearchanging time, following on from the filling phase, wherein the second specified required value variation depends both on the torque of the driving engine and on the gearbox output rotational speed, wherein a required value $M\_Kup\_soll$ for the transmission torque of the frictional connection is taken into account for the formation of the correction value in the rotational speed adaptation phase under the condition that (1a) $M\_Kup\_soll=k\_Kup*p\_soll$, where $p\_soll$ is equal to the current required value of the working pressure in accordance with the second specified required value variation $p=f(M\_Mot;n\_ab)$, and wherein the correction value is determined under the same conditions (2) to (5) with the exception of the condition (1) in the filling phase and in the rotational speed adaptation phase.

12. A method according to claim 11, wherein the correction value is determined using an average of a plurality of values of the deviations of the transmission torque of the frictional connection, the values being respectively determined in one time step.

13. A method according to claim 12, wherein the correction value $p\_kor$ is determined from the pressure difference dp and from a damping factor $k\_D$ in accordance with the condition that $p\_kor=dp*k\_D$, where $0<k\_D<1$.

14. A method according to claim 11, wherein the correction value $p\_kor$ is determined from the pressure difference dp and from a damping factor $k\_D$ in accordance with the condition that $p\_kor=dp*k\_D$, where $0<k\_D<1$.

15. A method according to claim 10, wherein the correction value is determined using an average of a plurality of values of the deviations of the transmission torque of the frictional connection, the values being respectively determined in one time step.

16. A method according to claim 15, wherein the correction value $p\_kor$ is determined from the pressure difference dp and from a damping factor $k\_D$ in accordance with the condition that $p\_kor=dp*k\_D$, where $0<k\_D<1$.

17. A method according to claim 10, wherein the correction value $p\_kor$ is determined from the pressure difference dp and from a damping factor $k\_D$ in accordance with the condition that $p\_kor=dp*k\_D$, where $0<k\_D<1$.

18. A method of controlling a working pressure of a pressure medium actuator for actuating a frictional connection which can engage and disengage between associated gearbox elements of a gear-changing appliance of an automatic discrete step gearbox of a motor vehicle, in which arrangement upon the appearance of a gear-changing signal for a gear-change, a required value of the working pressure is set by an electronic control unit by activation of an electromagnetic closed-loop control valve in accordance with a specified variation with time during a filling phase of the gear-changing period, said filling phase ending at a time at which the working pressure in the actuator and an output pressure of the connected closed-loop control valve have the same contact pressure value, said method comprising the steps of:

determining the specified required value variation in the filling phase by a correction value which is determined by a pressure difference corresponding to a torque deviation between an actual value and a required value of a transmission torque of the frictional connection;

determining the required value of the transmission torque as a function of a required pressure value of the specified required value variation and a geometry factor depending on the geometrical dimensions of the frictional connection;

determining the actual value of the transmission torque as a function of the torque of the gearbox input shaft and the moment of inertia of the rotating masses;

determining the torque of the rotating masses as a function of the rotating masses and a differentiated rotational speed of the gearbox input shaft;

determining the torque of the gearbox input shaft as a function of a rotational speed of a driving engine, a rotational speed of a turbine wheel of a hydrodynamic torque converter connected to the gearbox input shaft, a torque converter characteristic lambda with the associated parameters of engine rotational speed and rotational speed of the turbine wheel and a constant of the torque converter;

determining the pressure difference of the working pressure as a function of the torque deviation of the transmission torque and a geometry factor of the frictional connection; and controlling the working pressure of the pressure medium actuator as a function of said correction value.

* * * * *